March 29, 1949.  J. J. ALIKONIS  2,465,828
METHOD OF MAKING CHOCOLATE CONFECTIONERIES
Filed May 19, 1947
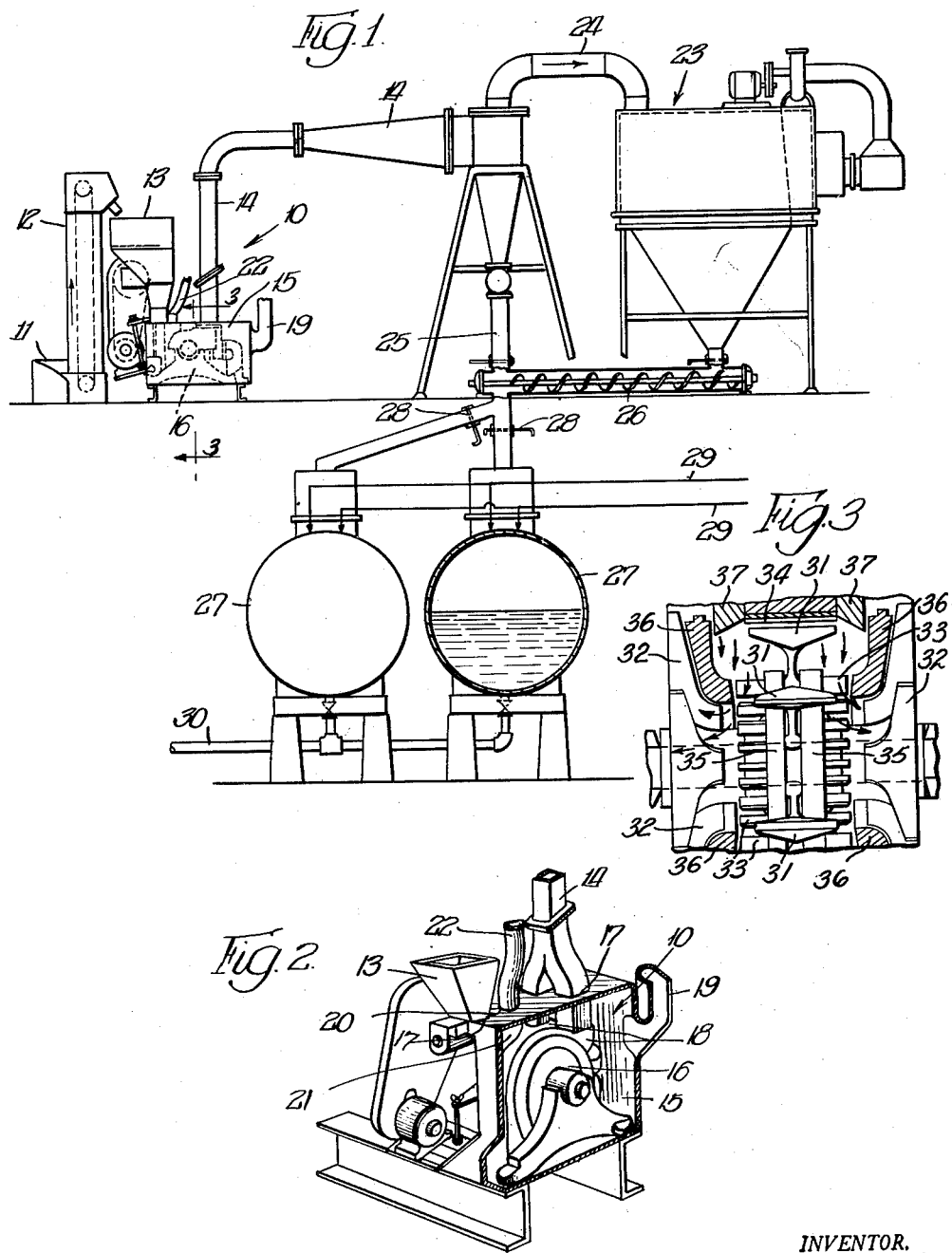
INVENTOR.
Justin J. Alikonis,
BY
Cromwell, Greist & Warden
Attys Patented Mar. 29, 1949

2,465,828

UNITED STATES PATENT OFFICE 2,465,828

METHOD OF MAKING CHOCOLATE CONFECTIONERIES

Justin J. Alikonis, Bloomington, Ill., assignor to Paul F. Beich Company, Bloomington, Ill., a corporation of Illinois Application May 19, 1947, Serial No. 748,864

3 Claims. (Cl. 99—23)

The present invention relates to a method of making chocolate confectionery possessing superior qualities of taste, texture and aroma, and to an apparatus for performing the method.

It is a general object of the invention to provide a chocolate making process and apparatus for carrying out the same, wherein all of the dry ingredients of the chocolate are ground and pulverized to an exceedingly fine particle size in a single abrasive and scarifying type of pulverizing operation under conditions which preclude substantial liquefying or gumming of any of said ingredients, and in particular of the cacao nibs which are the basic ingredient of the chocolate product.

A further object is to provide a method and apparatus for manufacturing chocolate which eliminate need for multiple grinding procedures to process the cacao nibs by reducing them to a viscous liquid or semi-plastic consistency, commonly known as chocolate liquor, and in which the nibs are ground and pulverized in a single operation, along with all other dry ingredients, to an exceedingly fine particle size.

A still further object is to provide a method and apparatus for chocolate confectionery manufacture which are notable for the savings in equipment, space, labor and power which is made possible, while producing a chocolate product of exceedingly fine quality, definitely superior to that of chocolate confections produced by existing, multiple grinding procedures.

Yet another and more specific object is to provide a method and apparatus wherein the dry ingredients, particularly including the basic cacao nibs, are mixed and successively ground to exceedingly fine and uniform particle size by an abrading and scarifying action, in which the pulverizing step is carried out at a lowered temperature and under controlled air supply conditions, so as to enable the reduction of the cacao nibs without liquefying the same and objectionably clogging or gumming the pulverizer.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

In the drawings,

Fig. 1 is a schematic or diagrammatic view illustrating a commercial system for performing the process of the invention in a continuous, as distinguished from a batch, operation;

Fig. 2 is a fragmentary perspective view, further illustrating certain special provisions for supplying the pulverizing equipment of the apparatus with a conditioned and cooled air supply; and Fig. 3 is an enlarged fragmentary view in vertical transverse section through the grinder housing of the apparatus on a line generally corresponding to line 3—3 of Fig. 1.

In my copending application Serial No. 682,771, filed July 11, 1946, I illustrate and describe an improved method and apparatus for manufacturing chocolate confectionery wherein the dry ingredients, excepting the basic cacao nib ingredient of the ultimate chocolate product, are ground to a particle size not exceeding 25 microns in a single grinding and pulverizing operation. As pointed out in detail in the aforesaid application, this improvement eliminates much of the time-honored, multiple phase equipment including grinding mills, melangeurs, refiners and conches, or equivalent particle reducing and mixing apparatus which has been relied on heretofore in the production of fine chocolate confections.

The dried or cured cacao bean, and in particular the so-called cacao nib, cocoa nib or cracked cocoa derived therefrom, is the basic raw material from which cacao products or chocolate, as distinguished from cocoa powder, are prepared. These cacao nibs are prepared by cleaning, roasting and cracking after removing the shell of the cacao bean. The nibs are separated from the waste shell and other products and, under ordinary procedures, are rendered to a solid or semi-plastic condition known as chocolate liquor by grinding the nibs finely in a so-called triple burr mill between natural or aloxite stones. The grit size and design of the bosom and the furrows and feathering of the cutting and grinding stone are the controlling factors in the fineness of the grind. Various roller type mills are also employed to process chocolate liquor from the original nibs, all requiring excessive space to house the equipment, as well as having large personnel and power requirements.

The different varieties and grades of cacao beans contain different percentages of cacao fat in the nibs, but they seldom contain less than 50% by weight of cacao fat. This high content of cacao fat, plus its low melting point (i. e., in the neighborhood of 86-89° F.), has prevented the grinding of the nibs in centrifugal, air flotation and hammer type grinders. The operation of such pulverizers involves the centrifugal flowing of the ground material in opposition to a fan-created air stream in the pulverizer housing, separating, recirculating and regrinding the insufficiently ground particles by reason of a balanced reaction of their centrifugal force and aerodynamic force, while smaller particles which meet size requirements are discharged from the mill. However, the treatment of cacao nibs in installations of this type has not been practical heretofore, because of the tendency of the cacao fat to melt and to clog or gum the abrasion machinery. Hence, grinding of the cacao nibs has heretofore been accomplished exclusively by the multiple phase, progressive size reduction operations referred to above.

I have found that, under controlled conditions of roast of the cacao nibs and of their moisture content and of the temperature and humidity of the atmosphere in the pulverizer housing, a mixture of all the dry ingredients of the desired chocolate confectionery, including the cacao nibs, can be successfully pulverized continuously and without clogging in a pulverizer of the type referred to above. The result is an extremely fine powder, which, when subsequently mixed with the liquid confectionery ingredients, produces a superior chocolate or chocolate coating without further processing.

In performing the method, the cacao beans are roasted to a medium or medium high roast in continuous roasters enabling a positive control, in operation. Of course, the conditions of a given exact roast will depend to a considerable extent on the variety, grade and blend of cacao nibs used, but I contemplate that the moisture content of the cacao nibs not be over 3.8% at any time, since moisture toughens the cacao nibs. A medium or medium high roast normally yields a cacao nib that is crisp and brittle and has a fine chocolate flavor and aroma, readily distinguishable from low roasted nibs which are tougher and lack the fine flavor and aroma.

In order to achieve the desired results of controlling the moisture content, dry, cool air is preferably used at all times to cool the roasted nibs and in conveying the same to the pulverizer for processing; and maintenance of controlled conditions of temperature and humidity throughout the pulverization operation is an essential feature of the invention, as will appear.

A suitable pulverizer, together with supply and discharge equipment for the purpose of the invention, is illustrated in the drawings. The reference numeral 10 in general designates a conventional screenless hammer type pulverizer adapted to produce a product of a particle size of from 1 to 25 microns. This pulverizer, which is of a standard manufacture, designated "Mikro-Atomizer," the product of the Pulverizer Machinery Company, of Summit, New Jersey, operates on the basic principle of separating and recirculating the ground particles in a pulverizer housing by a balanced reaction of centrifugal force and air flotation or aerodynamic drag, as pointed out above, so that the larger sizes are retained in the grinding section of the mill as long as is required for their ultimate reduction to desired particle size.

It is not believed necessary to illustrate and describe in detail the construction of pulverizer 10, however, in operation, referring to Figs. 2 and 3, the ground material in the pulverizer housing 16 is thrown by centrifugal force into the path of an annular series of individually pivoted, rotating hammers 31, in opposition to an air stream created by a built-in rotary fan 32. Said stream travels radially inwardly of the housing and exits axially through the blades of said fan in the direction indicated by arrows in Fig. 3 to expel the particles into a discharge duct 14. In so traveling, the particles are struck by the separator blades 33 which rotate with the fan blades, and are centrifugally thrown radially outwardly by said separator blades. The greater centrifugal force of the larger and coarser particles overcomes the radial inward the air drag tending to expel the same from the housing, and returns them into the path of hammer impact against the grinding surface 34. The air drag on the smaller particles overcomes their centrifugal force and delivers them axially from the housing. The point of balance between these two opposing forces, and therefore the control of the maximum size of the delivered pulverized particles, is readily regulated by control of velocity of the fan-created air stream. The structural features of the aerodynamic pulverizer unit 10, such as the hammer carrying rotor 35, dispersion rings 36, deflector rings 37 and fans are well known to those skilled in the art, hence require no further description.

The dry materials of the chocolate composition, including prepared roasted and cooled cacao nibs, sugar, salt, dry milk powder and the like, are charged to the hopper 11 of a mechanical bucket type elevator 12 associated with the pulverizer, from which they are discharged to the storage hopper 13 of the latter. Pulverizer 10 processes the ingredients by the operations referred to above to such an extent that approximately 99% thereof will pass through a 325 mesh screen. No particle is greater than 25 microns in size and the great bulk of the grind is much finer than that. This pulverized product is blown upwardly and laterally into discharge duct 14.

In order to maintain the desired temperature and humidity conditions throughout the operation of pulverizing the cacao nibs and other dry ingredients, I preferably enclose the pulverizer in a casing 15 which surrounds the pulverizer housing 16 in the manner illustrated in Fig. 2. Supply hopper 13 discharges through the casing 15 to the intake side of the pulverizer housing and said casing 15 is appropriately sealed, as indicated at 17, around hopper 13 and around the joint of discharge duct 14 with the casing. Said duct is forked at its lower end for association with the dual discharge throats 18 of pulverizer 10.

Casing 15 is supplied internally with conditioned cooling air through a duct 19 opening in one side thereof, said duct being in turn connected to a source of suitably refrigerated air of any conventional nature, which it is not believed necessary to describe. The materials being reduced in the pulverizer are to be maintained at a temperature below that which would result in substantial liquefaction of the cocoa butter in the nibs. The make-up of the mix of materials entering the pulverizer determines the maximum permissible temperature. For example, for a milk chocolate composition having, say, 10% chocolate nib component, a temperature of 78° F. is acceptable; but for a chocolate compound having a higher percentage of nibs, for example, up to 35%, a lower temperature of about 68° F. is required. Accordingly, provision is made to supply an adequate volume of air through duct 19 to maintain the pulverizer parts at or below said temperature, in conjunction with other provisions to be described. Suitable vaned openings in the pulverizer housing 16 admit conditioned air from the casing interior to the materials being reduced by the pulverizer. Such cooling of the atmosphere surrounding the pulverizer and of the air entering its housing inhibits melting of the cocoa fat content of the nibs and maintains the nib particles in an appropriately dry condition, corresponding to the condition of the other dry ingredients, for their successful reduction to desired particle size and discharge by the pulverizer 10.

An auxiliary air opening 20 is provided in the top of casing 15, which leads to a supplemental air intake 21 of the pulverizer and is also communicated with a supply or source of cool dry air (not shown) as by a duct 22. This furnishes air with the incoming charge of dry ingredients to control their temperature and humidity, and in general facilitates the feeding thereof to the pulverizer.

The remainder of the apparatus is generally similar to that illustrated and described in my prior copending application referred to above, comprising a standard type automatic dust collector 23 through which a certain percentage of the finer particles of the output of the pulverizer is delivered through a duct 24. These particles are collected and returned to the discharge conduit 25, which also receives the discharge of duct 14, by a screw conveyor 26. The ground dry ingredients are discharged selectively into the Stehling tanks or other appropriate mixing and storage equipment 27 under the control of the shutter type valves 28. There they are mixed with measured quantities of liquid ingredients, such as flavoring, lecithin and the like through supply lines which are diagrammatically illustrated and resignated by the reference numeral 29. The mix is withdrawn as desired through the pipes 30.

Cacao nibs which are handled under a controlled condition of restricted moisture content are crisp and easily broken up into very minute pieces which, when introduced in a mixture with other dry ingredients in a refrigerated atmosphere, lend themselves to efficient and rapid reduction in the pulverizer 10. The nibs may in fact be preliminarily reduced in size to a considerable degree in the standard cracker and fanner wherein certain husking or winnowing steps are performed. The refrigerated atmosphere wherein final pulverizing along with the other dry ingredients is later carried out allows for the rupturing of the fat cells of the cacao nibs with very little, if any, melting of the fat content. As a result, the nibs are reduced to minute particle size while maintaining the form of a dry, fine powder capable of passing through the pulverizer 10 continuously without clogging.

The relatively coarse, rough products such as sugar, salt and the like, have a surface scarifying and abrading action on the nibs in the pulverization procedure which further tends to prevent the arising of a gummy condition. Thus, though a momentary rise in temperature in pulverizer 10 may tend to cause momentary melting of some of the cacao fat, the small quantity of liquid involved is readily absorbed in and by the scouring action of the coarse dry ingredients, especially the sugar, so that no serious tendency to clog the apparatus arises.

While the normal operating temperature in an uncooled pulverizer of the type under consideration may reach 115° F. or higher, which is sufficiently hot to quickly reduce the apparatus to inoperativeness if handling cacao nibs, a cooling of the pulverizer to 89° F. or lower will result in continuous efficient production. However, as stated above, cooling to a point below the melting point of the cocoa fat is contemplated by the invention.

I am aware that it has been proposed to dry grind dry ingredients of a cocoa coating compound employing cocoa powder as the basic ingredient, in turn requiring separating, screening and further processing of the ground components. No problems of fat liquefaction, gumming and clogging are presented in such procedure. Thus in the manufacture of cocoa powder, cacao nibs are processed to a chocolate liquor condition, as in the production of true chocolate, after which said liquor is pressed in hydraulic presses for periods ranging from 10 minutes to two hours to express fat therefrom. The cocoa presscake left is scraped from the press, cooled, broken by special machinery, subjected to magnetic treatment to remove stray iron, and then run through a pulverizer. The ground material is then cooled on the conveyor, passed through a sieve or air-treated to separate the fine cocoa from the coarse, which is returned again to the pulverizer to be ground over and over again. The ultimate product is the cocoa powder of commerce having a low fat content.

The present method by contrast involves the direct grinding of fatty cacao nibs along with all usual dry ingredients, under controlled conditions of temperature and moisture content, and maintain all the fatty constituent of the basic nibs. It eliminates the multiple grinding, mixing and size reducing procedures heretofore thought necessary and desirable in the treatment of cocoa nibs, as well as the expensive machine installations and the excessive space, personnel, and power requirements entailed by these earlier procedures. A great saving in production time and increase in output capacity are effected by the present method and apparatus in addition to the above mentioned advantages.

I claim:

1. A method of making chocolate confectionery directly from prepared cacao nibs and other dry and wet ingredients, comprising controlling the moisture content of the nibs not to exceed 3.0%, mixing proportionate quantities of said low moisture content, unground nibs and said dry ingredients, grinding said mixture of nibs and dry ingredients in an atmosphere not substantially in excess of the melting point of the cocoa fat of the nibs whereby to prevent substantial melting during grinding and thereafter mixing said ground nibs and dry ingredients with the wet ingredient of the confectionery.

2. A method of making chocolate confectionery from prepared cacao nibs and other dry and wet ingredients, controlling the moisture content of the nibs not to exceed 3.0%, mixing proportionate quantities of said low moisture content, unground nibs and at least one other dry ingredient, grinding said mixture to minute particle size while controlling the temperature of the grinding atmosphere at not substantially higher than 90° F., whereby to prevent substantial melting of the cocoa fat of the nibs during grinding, and mixing the ground nibs and dry ingredients with one or more wet ingredients of the confectionery other than chocolate liquor.

3. A method of making chocolate confectionery from perpared cacao nibs and other dry and wet ingredients, controlling the moisture content of the nibs not to exceed 3.0%, mixing proportionate quantities of said low moisture content, unground nibs and at least one other dry ingredient, grinding said mixture to minute particle size while controlling the temperature of the grinding atmosphere not to exceed 78° F., whereby to prevent substantial melting of the cocoa fat of the nibs during grinding, and mixing the ground nibs and dry ingredient with one or more wet ingredients of the confeciotnery other than chocolate liquor.

JUSTIN J. ALIKONIS.

REFERENCES CITED

The following references are of record in the file of this patent:

UNITED STATES PATENTS

| Number | Name | Date |
| --- | --- | --- |
| 441,951 | Goetz | Dec. 2, 1890 |
| 1,032,931 | Neumann | July 16, 1912 |
| 1,035,303 | Bausman | Aug. 13, 1912 |
| 1,685,956 | Podszus | Oct. 2, 1928 |
| 1,725,155 | McAllister | Aug. 20, 1929 |
| 1,971,314 | Lauenstein | Aug. 21, 1934 |
| 2,147,549 | Roselius | Feb. 14, 1939 |
| 2,356,181 | Rubens | Aug. 22, 1944 |
| 2,384,077 | Crosley et al. | Sept. 4, 1945 |
| 2,400,382 | Arnold | May 14, 1946 |